US006587254B2

(12) United States Patent
Matsunaga et al.

(10) Patent No.: US 6,587,254 B2
(45) Date of Patent: Jul. 1, 2003

(54) IMAGE DISPLAY MEDIUM

(75) Inventors: Takeshi Matsunaga, Hadano (JP); Kiyoshi Shigehiro, Fujisawa (JP); Yoshiro Yamaguchi, Atsugi (JP); Yoshinori Machida, Atsugi (JP); Motohiko Sakamaki, Hadano (JP)

(73) Assignee: Fuji Xerox Co., Ltd., Tokyo (JP)

( * ) Notice: Subject to any disclaimer, the term of this patent is extended or adjusted under 35 U.S.C. 154(b) by 44 days.

(21) Appl. No.: 09/906,686

(22) Filed: Jul. 18, 2001

(65) Prior Publication Data

US 2002/0051280 A1 May 2, 2002

(30) Foreign Application Priority Data

Nov. 2, 2000 (JP) ....................................... 2000-336557

(51) Int. Cl.[7] .......................... G02B 26/00; G09G 3/34; G03G 17/04

(52) U.S. Cl. ......................... 359/296; 345/107; 430/32; 430/38

(58) Field of Search ................................. 359/296, 250, 359/252; 345/107, 106, 85, 84; 204/600, 450; 430/32, 34, 38

(56) References Cited

U.S. PATENT DOCUMENTS 3,896,327 A * 7/1975 Schermerhorn ............. 313/485
4,093,534 A * 6/1978 Carter et al. ................ 359/296
4,306,773 A * 12/1981 Arnoldussen ............... 359/272
5,634,836 A * 6/1997 Lepselter ...................... 445/24

FOREIGN PATENT DOCUMENTS

JP A 2000-347483 12/2000

OTHER PUBLICATIONS

"New Toner Display Device I", *Japanese Hardcopy '99*, pp. 249–252. Hoshino, Katsuyoshi.
"New Toner Dispaly Device II", *Japanese Hardcopy '99 Fall Papers*; pp. 10–13 Katshiko Sugawara.

* cited by examiner

*Primary Examiner*—Hung Xuan Dang
*Assistant Examiner*—Tuyen Tra
(74) *Attorney, Agent, or Firm*—Oliff & Berridge, PLC

(57) ABSTRACT

An image display medium that can maintain stable display characteristics without dew condensing on a display substrate surface or on particles in almost all environments in which the image display medium is presumed to be used, even if there are changes in the environment external to the image display medium. In a closed gap formed between a display substrate having an electrode and a back substrate disposed opposite to the display substrate and having an electrode, plural kinds of particle groups differing in color and charge characteristics and movable between the substrates by an electric field are sealed. The gap is given a proper amount of water vapor so that dew does not condense within a predetermined temperature range. Thus, favorable and stable display characteristics can be obtained.

19 Claims, 3 Drawing Sheets

○: FAVORABLE DISPLAY
△: SLIGHT PROBLEMS
×: IMPOSSIBLE TO DISPLAY

| STEAM LEVEL [g/m³] \ TEMPERATURE [°C] | 30 | 20 | 10 | 0 | -10 | -20 |
|---|---|---|---|---|---|---|
| 10 | ○ | △ | × | × | × | × |
| 5 | ○ | ○ | ○ | × | × | × |
| 1 | ○ | ○ | ○ | ○ | △ | × |
| 0.8 | ○ | ○ | ○ | ○ | ○ | △ |
| 0.6 | ○ | ○ | ○ | ○ | ○ | ○ |
| 0.4 | ○ | ○ | ○ | ○ | ○ | ○ |

○: FAVORABLE DISPLAY
△: SLIGHT PROBLEMS
×: IMPOSSIBLE TO DISPLAY

| ATMOSPHERIC PRESSURE [Torr] \ TEMPERATURE [°C] | 20 | 10 | 0 | −10 | −20 |
|---|---|---|---|---|---|
| 100 | ○ | ○ | × | × | × |
| 50 | ○ | ○ | △ | × | × |
| 30 | ○ | ○ | ○ | △ | × |
| 20 | ○ | ○ | ○ | ○ | △ |
| 10 | ○ | ○ | ○ | ○ | ○ |

IMAGE DISPLAY MEDIUM

BACKGROUND OF THE INVENTION

1. Field of the Invention

The present invention relates to an image display medium, and more particularly to a repeatedly rewritable image display medium using coloring particles.

2. Description of the Related Art

Conventionally, as display technology using toner, an image display medium having conductive coloring toner and white particles sealed in a predetermined gap between a display side electrode substrate and a non-display side electrode substrate disposed opposite to the display side electrode substrate has been proposed ("Toner Display", *Japan Hardcopy* '99 Papers, pp. 249–252, *Japan Hardcopy* '99 Fall Papers, pp. 10–13). In such an image display medium, an electric charge is applied to the conductive toner through a charge conveying layer disposed on the electrode inner surface of the non-display side electrode substrate. By action of an electric field generated between the two electrode substrates, the charged conductive coloring toner moves to the display side electrode substrate disposed opposite to the non-display side electrode substrate. As a result, the conductive coloring toner adheres to the inner side of the display side electrode substrate, so that an image is displayed by the contrast between the conductive coloring toner and white toner.

In conventional image display mediums, however, when conductive toner and particles are sealed between the electrode substrates of the image display medium in an environment having, for example, a temperature of 25° C. and humidity of 50%, water vapor content in the gap between the two electrode substrates is 11.5 g/m$^3$. When the image display medium is used in an environment having an external air temperature of 10° C., dew condensation occurs on the surface of the conductive toner, on the surface of the particles and on the electrode substrate surfaces in the gap since saturated water vapor content at 10° C. is 9.39 g/m$^3$. Thus, the water vapor pressure in the gap between the display side electrode substrate and non-display side electrode substrate of the image display medium is determined by the environmental atmosphere at which the display side electrode substrate and non-display side electrode substrate are sealed. Accordingly, when the image display medium is used in an environment having a different external air temperature, dew condensation may occur on the surfaces of the electrode substrates, and on the surfaces of the conductive toner and particles within the gap. Further, the higher the water vapor content, the less the charge amount of the conductive toner becomes. When the charge amount of the conductive toner becomes less than a predetermined level, the conductive toner cannot be moved by the electric field formed between the substrates. As a result, favorable display characteristics cannot be obtained.

SUMMARY OF THE INVENTION

The present invention has been devised in light of the above problems. It is an object of the present invention to provide an image display medium that can maintain stable display characteristics without dew condensing on a display substrate surface or on particles in almost all environments in which the image display medium is presumed to be used, even if there are changes in the environment external to the image display medium.

According to a first aspect of the invention, an image display medium comprises: a pair of substrates, at least one of the substrates being light permeable; a gap disposed between the substrates; and plural kinds of particle groups differing in color and charging characteristic, the particle groups being sealed in the gap between the substrates and movable between the substrates by an electric field applied to the particles, wherein water vapor content in the gap is in a range in which dew does not condense in an environment in which the image display medium is used.

According to the invention of the first aspect, the image display medium is provided with a transparent display substrate, the display substrate including an electrode and being disposed at the image display surface side of the image display medium, and a back substrate, the back substrate including an electrode and being disposed opposite to the display substrate. A gap is formed between the display substrate and the back substrate. Plural kinds of particle groups differing in color and charge characteristics are sealed in the gap. The particle groups can move between the pair of substrates by an electric field created by applying voltage between the pair of electrodes. The gap includes a predetermined amount of water vapor within a predetermined temperature range to prevent dew condensation. Therefore, there is no dew condensation on the surfaces of the display substrate and the back substrate, or on the particle groups sealed in the gap in almost all environments in which the image display medium is presumed to be used, even if there are changes in the environment external to the image display medium. Consequently, there is no drop in the charge amount of the particle groups due to condensation of dew, so that favorable and stable display characteristics can be obtained.

According to a second aspect of the invention, an image display medium comprises: a pair of substrates, at least one of the substrates being light permeable; a gap disposed between the substrates; and plural kinds of particle groups differing in color and charging characteristic, the particle groups being sealed in the gap between the substrates and movable between the substrates by an electric field applied to the particles, wherein the water vapor content in the gap is 0.8 g/m$^3$ or less.

According to the invention of the second aspect, the image display medium is provided with a transparent display substrate, the display substrate including an electrode and being disposed at the image display surface side of the image display medium, and a back substrate, the back substrate including an electrode and being disposed opposite to the display substrate. A gap is formed between the display substrate and the back substrate. Plural kinds of particle groups differing in color and charge characteristics are sealed in the gap. The particle groups can move between the pair of substrates by an electric field created by applying voltage between the pair of electrodes. The gap includes a water vapor content of 0.8 g/m$^3$. Therefore, there is no dew condensation on the surfaces of the display substrate and the back substrate, or on the particle groups sealed in the gap in almost all environments in which the image display medium is presumed to be used, even if there are changes in the environment external to the image display medium. Consequently, there is no drop in the charge amount of the particle groups due to condensation of dew, so that favorable and stable display characteristics can be obtained.

According to a third aspect of the invention, an image display medium comprises: a pair of substrates, at least one of the substrates being light permeable; a gap disposed between the substrates; and plural kinds of particle groups differing in color and charging characteristic, the particle groups being sealed in the gap between the substrates and movable between the substrates by an electric field applied to the particles, wherein pressure in the gap is in a range in which dew does not condense in an environment in which the image display medium is used.

According to the invention of the third aspect, the image display medium is provided with a transparent display substrate, the display substrate including an electrode and being disposed at the image display surface side of the image display medium, and a back substrate, the back substrate including an electrode and being disposed opposite to the display substrate. A gap is formed between the display substrate and the back substrate. Plural kinds of particle groups differing in color and charge characteristics are sealed in the gap. The particle groups can move between the pair of substrates by an electric field created by applying voltage between the pair of electrodes. The gap includes a specific value of pressure, in a specified temperature range, for preventing dew condensation. Therefore, there is no dew condensation on the surfaces of the display substrate and the back substrate, or on the particle groups sealed in the gap in almost all environments in which the image display medium is presumed to be used, even if there are changes in the environment external to the image display medium. Consequently, there is no drop in the charge amount of the particle groups due to condensation of dew, so that favorable and stable display characteristics can be obtained.

According to a fourth aspect of the invention, an image display medium comprises: a pair of substrates, at least one of the substrates being light permeable; a gap disposed between the substrates; and plural kinds of particle groups differing in color and charging characteristic, the particle groups being sealed in the gap between the substrates and movable between the substrates by an electric field applied to the particles, wherein the pressure in the gap is 20 Torr or less.

According to the invention of the fourth aspect, the image display medium is provided with a transparent display substrate, the display substrate including an electrode and being disposed at the image display surface side of the image display medium, and a back substrate, the back substrate including an electrode and being disposed opposite to the display substrate. A gap is formed between the display substrate and the back substrate. Plural kinds of particle groups differing in color and charge characteristics are sealed in the gap. The particle groups can move between the pair of substrates by an electric field created by applying voltage between the pair of electrodes. The gap includes a pressure of 20 Torr or less. Therefore, there is no dew condensation on the surfaces of the display substrate and the back substrate, or on the particle groups sealed in the gap in almost all environments in which the image display medium is presumed to be used, even if there are changes in the environment external to the image display medium. Consequently, there is no drop in the charge amount of the particle groups due to condensation of dew, so that favorable and stable display characteristics can be obtained.

Figure 1:
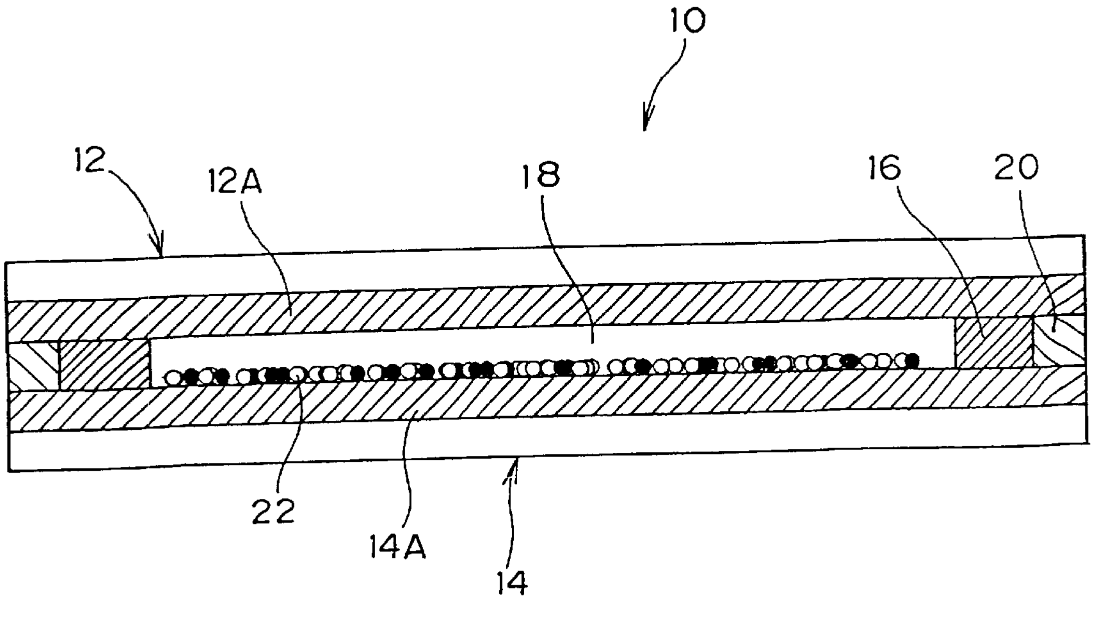
FIG. 1 is a schematic, cross-sectional explanatory diagram of an image display medium pertaining to an embodiment of the present invention.

DESCRIPTION OF THE PREFERRED EMBODIMENTS (First Embodiment)

Referring to the drawings, a first embodiment of the present invention will now be described in detail below.

As shown in FIG. 1, an image display medium 10 according to this embodiment comprises a transparent display substrate 12 disposed at the side of the image display medium at which an image is displayed, and a back substrate 14 which is a non-display substrate disposed opposite to the display substrate 12. The display substrate 12 and back substrate 14 are disposed, via a partition wall 16, with a predetermined gap 18 disposed between. The display substrate 12 and back substrate 14 are adhered and closed with an adhesive 20. In the present embodiment, the display substrate 12 is 7059 glass with a transparent electrode ITO 12A of 50×50×1.1 mm, and the back electrode 14 is a substrate having a copper electrode 14A evaporated on an epoxy resin of 50×50 mm. The partition wall 16 is formed by photolithographic technology, using an ethylene resin on the back electrode 14. The adhesive 20 is a two-pack kind epoxy resin deaerated for 15 to 30 minutes at degree of vacuum of 400 Torr or less.

Although not shown particularly, dielectric materials such as polycarbonate resin are applied on the electrodes 12A and 14A to form dielectric layers. In the gap 18 formed between the display substrate 12 and back substrate 14, conductive particle groups 22 are sealed. In the present embodiment, the particle groups 22 comprise white particles, which are spherical fine particles of crosslinked polymethyl methacrylate containing titanium oxide in a volume average particle size of 20 μm mixing fine powder of titania treated with isopropyl trimethoxy silane at a ratio of 100:0.1 by weight (Techpolymer MBX-20-White, manufactured by Sekisui Chemical Industries), and black particles, which are spherical fine particles of crosslinked polymethyl methacrylate containing carbon in a volume average particle size of 20 μm (Techpolymer MBX-20-Black, manufactured by Sekisui Chemical Industries), by mixing at a ratio of 2:1 by weight.

The image display medium 10 includes voltage application means (not shown), and a desired voltage is applied to the electrode 12A of the display substrate 12 or to the electrode 14A of the back substrate 14, depending on image signals, whereby a desired electric field is formed between the electrode 12A of the display substrate 12 and the electrode 14A of the back substrate 14.

When preparing the image display medium 10, the display substrate 12 and the back substrate 14 are sealed in an environment having a water vapor content of 0.8 $g/m^3$ or less. Specifically, for example, in a chamber replaced with dry air to achieve an internal water vapor content of 0.8 $g/m^3$ or less, 25.6 mg of particle groups 22 is applied on the back substrate 14, and the display substrate 12 is placed, pressed and held, and adhered with the adhesive 20. Therefore, the water vapor content in the gap 18 formed between the display substrate 12 and back substrate 14 is 0.8 $g/m^3$ or less. In the present embodiment, dry air containing water vapor at 3 ppm or less is used. A hygrometer is disposed in the chamber, and the water vapor content is monitored. The gas in the gap 18 is not limited to dry air. Dry nitrogen, dry carbon dioxide, argon, helium, neon, xenon, and other gases which are inert at room temperature and contain water vapor at not more than 0.8 g/m$^3$ may be used.

The water vapor content in the gap 18 is limited to 0.8 g/m$^3$ or less for the following reason. Assuming the image display medium is to be used in an environment in which the external air temperature is −20° C. or higher, saturated water vapor content at −20° C. is about 0.8 g/m$^3$. Therefore, if the display substrate 12 and back substrate 14 are sealed in an environment in which the water vapor content is 0.8 g/m$^3$ or less, the atmosphere of the gap has a humidity less than 100% even in an environment of −20° C. Hence, dew condensation does not occur on the surface of the display substrate 12, the surface of the back substrate 14, or in the particle groups 22 in the gap 18. Since saturated water vapor content increases as temperature rises, if dew condensation does not occur in an environment of −20° C., it is also free from dew condensation in an environment having a temperature higher than −20° C. Therefore, when the water vapor content in the gap is 0.8 g/m$^3$ or less, which is the saturated water vapor content at −20° C., dew condensation does not occur on the substrate surface or on the particles in the gap, so that the charge amount of the particles can be maintained.

Figures 2, 3:
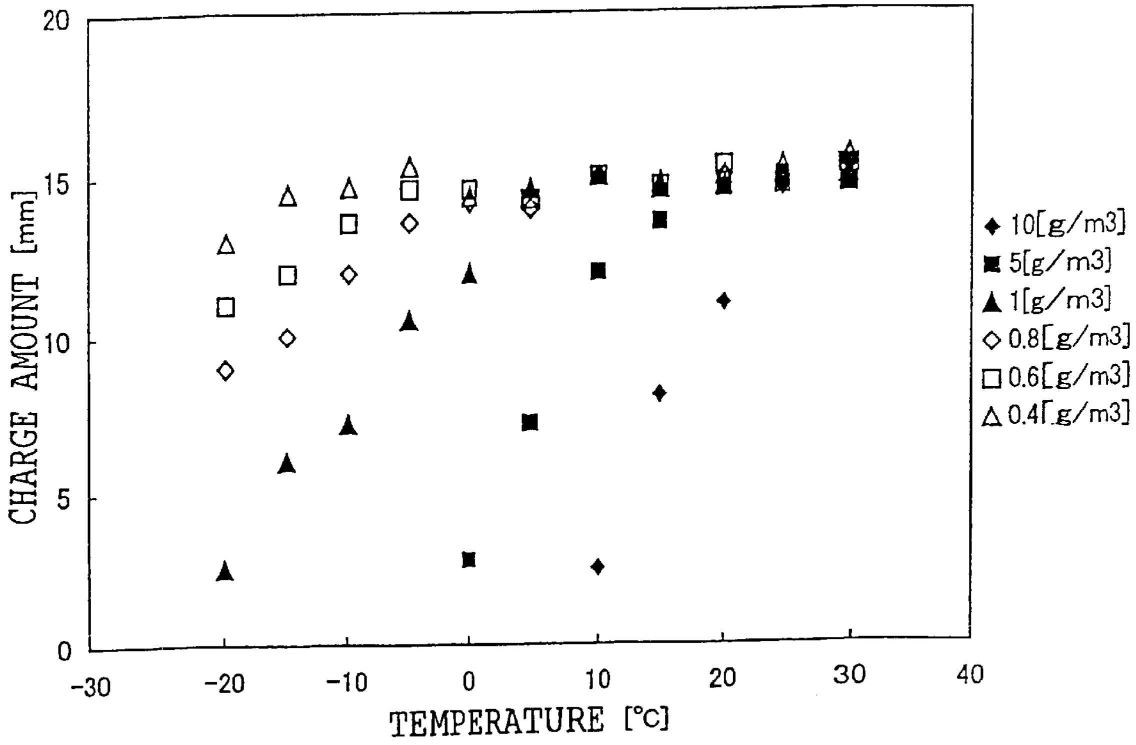
FIG. 2 is a graph showing modes of change in charge amount of particle groups due to changes in outside air temperature and water vapor content.
FIG. 3 is a table showing display states of the image display medium when external environmental temperature and water vapor content in a gap between substrates are varied.

FIG. 2 shows a comparative experiment, in which charge amounts of particles at various external air temperatures (environmental temperatures) are plotted for each water vapor content, with changes in charge amounts of particles due to changes in external air temperature and water vapor content indicated. As will be understood from FIG. 2, as external air temperature becomes lower, charge amount of particles decreases with respect to charge amount of particles in an environment in which water vapor content of the gap formed between the substrates is high. Even when external air temperature becomes lower, there is no remarkable drop in charge amount of particles in an environment in which the water vapor content in the gap between the substrates is 0.8 g/m$^3$ or less.

In another comparative experiment shown in FIG. 3, the display state of the image display medium is indicated when external environmental temperature is changed from −20° C. to 30° C. and the water vapor content in the gap between the substrates is changed from 0.4 g/m$^3$ to 10 g/m$^3$. In FIG. 3, circular marks indicate favorable display in both black and white, triangular marks indicate that the display is possible in spite of slight problems such as poor contrast, and X-marks indicate that display is completely impossible. As will be understood from FIG. 3, a substantially favorable display can be obtained in almost all of the external air temperatures shown in FIG. 3 when the water vapor content in the gap between the substrates is 0.8 g/m$^3$ or less.

Operation of the image display medium 10, i.e., driving of the particle groups, will now be described. When a positive DC voltage is applied to the electrode 14A of the back substrate 14 by voltage application means (not shown), negatively charged white particles of the particle groups 22 move to the back substrate 14 by action of an electric field. In contrast, positively charged black particles of the particle groups 22 move to the display substrate 12 by action of the electric field. Accordingly, only black particles uniformly adhere to the display substrate 12, and a favorable black display can be obtained. Strictly speaking, a few white particles adhere to the display substrate 12 because a miniscule amount of white particles charged in reverse polarity is present, but since the amount of adherent white particles is negligible, there is virtually no effect on the display image.

When a negative DC voltage is applied to the electrode 14A of the back substrate 14, the black particles adhering to the display substrate 12 move to the back substrate 14 and the white particles adhering to the back substrate 12 move to the display substrate 12. As a result, only white particles uniformly adhere to the display substrate 12, and a favorable white display can be obtained. Strictly speaking, a few black particles also adhere to the display substrate 12 because a miniscule amount of black particles charged in reverse polarity is present, but there is virtually no effect on the display image since the amount of adherent black particles is negligible.

Thus, in the image display medium 10 of the present embodiment, since the water vapor content is kept at 0.8 g/m$^3$ or less in the gap 18 formed between the display substrate 12 and back substrate 14, there is no dew condensation on the surfaces of the display substrate 12 and the back substrate 14, or on the particle groups 22 sealed in the gap 18 in almost all environments in which the image display medium 10 is presumed to be used, even if there are changes in the environment external to the image display medium. Further, there is no drop in the charge amount of the particle groups 22 due to condensation of dew, so that favorable and stable display characteristics can be obtained.

(Second Embodiment)

A second embodiment of the invention will now be described.

An image display medium according to the second embodiment of the invention comprises, the same as in the first embodiment shown in FIG. 1, a transparent display substrate 12 at the image display side, and a back substrate 14 which is a non-display substrate disposed in opposition to the display substrate 12, with a predetermined gap 18 and a partition wall 16 disposed therebetween. In the gap 18 formed between the display substrate 12 and back substrate 14, conductive particle groups 22 are sealed. The image display medium 10 has voltage application means (not shown), and a desired voltage is applied to the electrode 12A of the display substrate 12 or to the electrode 14A of the back substrate 14, depending on the image signal, so that a desired electric field is formed between the electrode 12A of the display substrate 12 and the electrode 14A of the back substrate 14.

When preparing the image display medium 10, the display substrate 12 and the back substrate 14 are sealed in an environment having a temperature of 28° C. and humidity of 80%, and the chamber is evacuated to a vacuum of 20 Torr or less by a rotary pump. In this atmosphere, 25.6 mg of particle groups 22 is applied on the back substrate 14, and the display substrate 12 is placed, pressed and held, and adhered with the adhesive 20. Therefore, pressure in the gap 18 formed between the display substrate 12 and back substrate 14 is 20 Torr or less.

The pressure in the gap 18 is limited to 20 Torr or less because the water vapor content in the gap can be decreased by reducing the pressure in the gap 18. For example, when the display substrate and back substrate of the image display medium are sealed in an environment having a temperature of 28° C. and humidity of 80%, the pressure in the gap is reduced until the water vapor content in the air becomes 0.8 g/m$^3$ since saturated water vapor content at 28° C. is 27.2 g/m$^3$. When decompression is continued so that the water vapor content becomes 0.8 g/m$^3$ at a pressure of 20 Torr in the gap, dew condensation does not occur on the substrate surfaces or on the particles in the gap, so that the charge amount of the particles can be maintained.

Figures 4, 5:
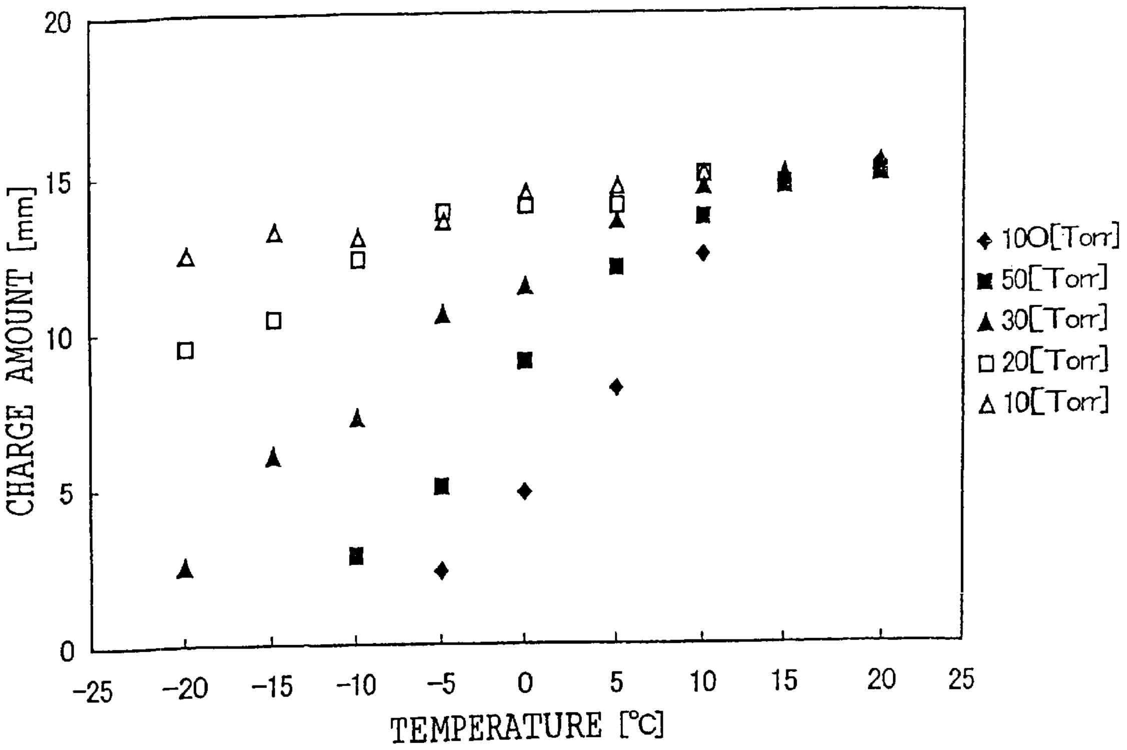
FIG. 4 is a graph showing modes of change in charge amount of particle groups due to changes in outside air temperature and in pressure in the gap.
FIG. 5 is a table showing display states of the image display medium when external environmental temperature and pressure in the gap between the substrates are varied.

FIG. 4 shows a comparative experiment, in which charge amounts of particles at various external air temperatures are plotted for each atmospheric pressure, with changes in charge amounts of particles due to changes in external air temperature and atmospheric pressure indicated. As will be understood from FIG. 4, as the external air temperature becomes lower, charge amount of particles decreases with respect to charge amount of particles in an environment in which the pressure in the gap formed between the substrates is high. Even when external air temperature becomes lower, there is no remarkable change in charge amount of particles in an environment in which the pressure in the gap between the substrates of 20 Torr or less.

In another comparative experiment shown in FIG. 5, the display state of the image display medium 10 is indicated when external environmental temperature is changed from −20° C. to 30° C. and the pressure in the gap between the substrates is changed from 10 Torr to 100 Torr. In FIG. 5, circular marks indicate favorable display in both black and white, triangular marks indicate that is possible in spite of slight problems such as poor contrast, and X-marks indicate that display is completely impossible. As will be understood from FIG. 5, a substantially favorable display can be obtained in almost all of the external air temperatures shown in FIG. 5 when the pressure in the gap between the substrates is 20 Torr or less.

Thus, in the image display medium 10 of the present embodiment, since the pressure is kept at 20 Torr or less in the gap 18 formed between the display substrate 12 and back substrate 14, there is no dew condensation on the surfaces of the display substrate 12 and the back substrate 14, or on the particle groups 22 sealed in the gap 18 in almost all environments in which the image display medium 10 is presumed to be used, even if there are changes in the environment external to the image display medium. Further, there is no drop in the charge amount of the particle groups 22 due to condensation of dew, so that favorable and stable display characteristics can be obtained.

As described herein, according to the present invention, stable display characteristics can be maintained without dew condensing on the display substrate surface or on the particles in almost all environments in which the image display medium is presumed to be used, even if there are changes in the environment external to the image display medium.

What is claimed is:

1. An image display medium comprising:
   - a pair of substrates, at least one of the substrates being light permeable;
   - a gap disposed between the substrates; and
   - plural kinds of particle groups differing in color and charging characteristic, the particle groups being sealed in the gap between the substrates and movable between the substrates by an electric field applied to the particles,
   - wherein water vapor content in the gap is in a range in which dew does not condense in an environment in which the image display medium is used.

2. The image display medium of claim 1, wherein the water vapor content in the gap is 0.8 $g/^3$ or less.

3. The image display medium of claim 1, wherein the water vapor content in the gap is 0.6 $g/m^3$ or less.

4. The image display medium of claim 1, wherein the water vapor content in the gap is 0.4 $g/m^3$ or less.

5. The image display medium of claim 1, wherein the gap includes a gas, the gas comprising dry air.

6. The image display medium of claim 1, wherein the gap includes a gas, the gas comprising dry nitrogen.

7. The image display medium of claim 1, wherein the gap includes a gas, the gas comprising carbon dioxide.

8. The image display medium of claim 1, wherein the gap includes a gas, the gas comprising argon.

9. The image display medium of claim 1, wherein the gap includes a gas, the gas comprising helium.

10. The image display medium of claim 1, wherein the gap includes a gas, the gas comprising neon.

11. The image display medium of claim 1, wherein the gap includes a gas, the gas comprising xenon.

12. An image display medium comprising:
    - a pair of substrates, at least one of the substrates being light permeable;
    - a gap disposed between the substrates; and
    - plural kinds of particle groups differing in color and charging characteristic, the particle groups being sealed in the gap between the substrates and movable between the substrates by an electric field applied to the particles,
    - wherein pressure in the gap is in a range in which dew does not condense in an environment in which the image display medium is used.

13. The image display medium of claim 12, wherein the pressure in the gap is 20 Torr or less.

14. The image display medium of claim 12, wherein the pressure in the gap is 10 Torr or less.

15. The image display medium of claim 12, wherein the gap includes a gas, the gas comprising dry air.

16. The image display medium of claim 12, wherein the gap includes a gas, the gas comprising dry nitrogen.

17. The image display medium of claim 12, wherein the gap includes a gas, the gas comprising carbon dioxide.

18. The image display medium of claim 12, wherein the gap includes a gas, the gas comprising rare gas.

19. A method of forming an image display medium, the method comprising the steps of:
    - (a) arranging a pair of substrates in spaced opposition to one another across a gap, with each substrate including an electrode extending there across, and one of the substrates and its respective electrode being substantially transparent;
    - (b) disposing at least two kinds of particle groups in the gap, with the particle groups differing in color and charging characters;
    - (c) restricting water vapor in the gap to no more than 0.8 grams per cubic meter or to no more than 20 Torr; and
    - (d) sealing the edges of the gap.

* * * * *